UNITED STATES PATENT OFFICE 2,229,650

GREEN SULPHUR DYES AND PROCESS FOR MANUFACTURING THE SAME

Walter Hagge and Herbert Bach, Wolfen, Kreis Bitterfeld, Germany, assignors to General Aniline & Film Corporation, a corporation of Delaware No Drawing. Application April 4, 1939, Serial No. 265,936. In Germany April 13, 1938

8 Claims. (Cl. 260—130)

The present invention relates to green sulphur dyes and the process for manufacturing the same and is based on the observation that the leucoindophenol-like compounds obtainable from 3,4,5,6-dibenzocarbazole or one of its derivatives by reaction with quinone-chlorimide or nitrosophenol may be transformed into sulphur-containing dyes with good properties of fastness by melting them with a polysulphide in the presence of an organic solvent such as methyl alcohol, butyl alcohol, cyclohexanol and others. The dyes obtained by this process dye vegetable fibers greenish-blue tints; in the presence of copper pure green tints are obtained.

The following examples illustrate the invention, the parts being by weight, unless otherwise stated:

*Example 1.*—The leucoindophenol obtained by condensing 13.3 parts of 3,4,5,6-dibenzocarbazole with 10.6 parts of para-quinone-chlorimide in the presence of sulphuric acid of 66° Bé. at a temperature of $-10°$ C. is introduced into a polysulphide solution obtained from 12 parts of concentrated sodium sulphide, 14.5 parts of sulphur and 50 parts by volume of ethyl alcohol whereupon the whole is boiled under reflux for about 60 hours. After working up in the usual manner a dye is obtained which dyes cotton in the hydrosulphite vat greenish-blue tints.

*Example 2.*—The leucoindophenol obtained from 13.3 parts of 3,4,5,6-dibenzocarbazole as described in Example 1 is heated under reflux for about 30 to 40 hours with a polysulphide solution obtained from 12 parts of concentrated sodium sulphide, 14.5 parts of sulphur, 60 parts by volume of butyl alcohol and 3 parts of copper bronze. Thereupon the reaction mixture is worked up in the usual manner. The dye thus obtained dyes cotton in the sodium sulphide bath green tints.

*Example 3.*—The leucoindophenol prepared from 14 parts of N-methyl-3,4,5,6-dibenzocarbazole and 10.6 parts of para-quinone-chlorimide is heated to boiling for about 50 hours together with a polysulphide solution obtained from 12 parts of concentrated sodium sulphide, 14.5 parts of sulphur, 50 parts by volume of alcohol and 3 parts of copper-bronze, whereupon the whole is worked up as usual. In a liquid containing sodium sulphide the dye thus obtained yields on cotton green tints.

*Example 4.*—The leucoindophenol prepared from 31.4 parts of N-hydroxyethyl-3,4,5,6-dibenzocarbazole and 20 to 25 parts of para-quinone-chlorimide in the manner indicated in Example 1 are boiled together with a polysulphide solution obtained from 24 parts of concentrated sodium sulphide, 29 parts of sulphur in the presence of 180 parts of butyl alcohol and about 4 to 6 parts of copper sulphide for about 30 to 50 hours at about 110 to 115° C. After driving off the butanol with steam, the residue is washed with a sodium chloride solution until the filtrate becomes colorless. For purification the dye is dissolved in sodium sulphide and separated in the usual manner.

It is obvious that our invention is not limited to the foregoing examples or to the specific details given therein. All the usual modifications of the sulphurizing process known to chemists skilled in the art may be applied and these variations are within the scope of the claims following hereafter.

What we claim is:

1. The process which comprises heating with a polysulphide, in the presence of an organic solvent of the group consisting of aliphatic and cyclic aliphatic alcohols, a leucoindophenol obtained from 3,4,5,6-dibenzocarbazole of the general formula

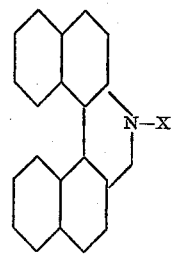

wherein X means a radical of the group consisting of hydrogen, alkyl and hydroxyalkyl, and a compound of the group consisting of para-quinone-chlorimide and para-nitrosophenol.

2. The process which comprises heating with a polysulphide, in the presence of an organic solvent of the group consisting of aliphatic and cyclic aliphatic alcohols, a leucoindophenol obtained from 3,4,5,6-dibenzocarbazole and a compound of the group consisting of para-quinone-chlorimide and para-nitrosophenol.

3. The process which comprises heating with a polysulphide, in the presence of an organic solvent of the group consisting of aliphatic and cyclic aliphatic alcohols, a leucoindophenol obtained from N-methyl-3,4,5,6-dibenzocarbazole and a compound of the group consisting of para-quinone-chlorimide and para-nitrosophenol.

4. The process which comprises heating with a polysulphide, in the presence of an organic solvent of the group consisting of aliphatic and cyclic aliphatic alcohols, a leucoindophenol obtained from N-hydroxyethyl-3,4,5,6-dibenzocarbazole and a compound of the group consisting of para-quinone-chlorimide and para-nitrosophenol.

5. The sulphur dyes obtainable according to claim 1.

6. The sulphur dyes obtainable according to claim 2.

7. The sulphur dyes obtainable according to claim 3.

8. The sulphur dyes obtainable according to claim 4.

WALTER HAGGE.
HERBERT BACH.